US012665693B2

(12) United States Patent
Li et al.

(10) Patent No.:     US 12,665,693 B2
(45) Date of Patent:     Jun. 23, 2026

(54) RECONFIGURABLE OPTICAL ADD AND DROP MULTIPLEXER SYSTEM WITH INTEGRATED WAVELENGTH SELECTIVE SWITCH ARRAY

(71) Applicant: Molex, LLC, Lisle, IL (US)

(72) Inventors: Minchun Li, Plano, TX (US); Gongjian Hu, Marina, CA (US); Lifu Gong, San Jose, CA (US); Feng Qing Zhou, San Jose, CA (US)

(73) Assignee: Molex, LLC, Lisle, IL (US)

( * ) Notice:     Subject to any disclaimer, the term of this patent is extended or adjusted under 35 U.S.C. 154(b) by 280 days.

(21) Appl. No.: 18/368,577

(22) Filed:     Sep. 15, 2023

(65)     Prior Publication Data

US 2024/0106558 A1     Mar. 28, 2024

Related U.S. Application Data

(60) Provisional application No. 63/377,296, filed on Sep. 27, 2022.

(51) Int. Cl.
      *H04J 14/02*     (2006.01)
      *H04Q 11/00*     (2006.01)
(52) U.S. Cl.
      CPC ...... *H04J 14/0212* (2013.01); *H04Q 11/0005* (2013.01); *H04Q 2011/0016* (2013.01)

(58) Field of Classification Search
      CPC ............. H04J 14/0212; H04Q 11/0005; H04Q 2011/0016
      See application file for complete search history.

(56)     References Cited

U.S. PATENT DOCUMENTS 9,608,757 B2 *     3/2017   Wellbrock ......... H04B 10/2972
2019/0115977 A1 *  4/2019   Yuki ................. H04J 14/02216

* cited by examiner

*Primary Examiner* — Kenneth N Vanderpuye
*Assistant Examiner* — Asif Shameem

(57)     ABSTRACT

A reconfigurable optical add and drop multiplexer (ROADM) system is provided. The ROADM system may include a switching system which includes at least one first WSS optically coupled to a tapping coupler and configured to receive an input optical signal from a first circulator, transmit a drop optical signal to a demultiplexer to drop one or more first wavelength channels, and output a through optical signal. The switching system may also include at least one second WSS optically coupled to the at least one first WSS and a multiplexer and configured to receive an add optical signal to add one or more second wavelength channels, receive the through optical signal, and output an output optical signal to a second circulator, and at least one OCM configured to monitor the input optical signal and the output optical signal.

20 Claims, 12 Drawing Sheets

RECONFIGURABLE OPTICAL ADD AND DROP MULTIPLEXER SYSTEM WITH INTEGRATED WAVELENGTH SELECTIVE SWITCH ARRAY

CROSS-REFERENCE TO RELATED APPLICATIONS

This application is based upon and claims priority to U.S. Provisional Application No. 63/377,296, filed on Sep. 27, 2022, the entire disclosure of which is incorporated herein by reference in its entirety for all purposes.

TECHNICAL FIELD

The present disclosure relates to reconfigurable optical add and drop multiplexer systems, and in particular but not limited to, reconfigurable optical add and drop multiplexer systems incorporating integrated wavelength selective switch arrays.

BACKGROUND

A reconfigurable optical add-drop multiplexer (ROADM) system is a system that can add, block, pass or redirect modulated infrared (IR) and visible light beams of various wavelengths in optical communication networks. Optical switches, e.g., wavelength selective switches (WSSs), are commonly used in a ROADM system to provide high-speed, high data rate communication capabilities. The optical communication networks often use optical wavelength division multiplexing to maximize the use of the optical spectrum. WSS assemblies permit optical signals to be selectively switched between optical receivers to carry out the desired communications functionality. It is always desirable to realize a rich optical network application and function through a compact, efficient and flexible structure.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein.

SUMMARY

The present disclosure provides examples of techniques relating to a ROADM system with an integrated WSS array.

According to a first aspect of the present disclosure, there is provided a ROADM system. The ROADM system may include a switching system configured to route optical signals through the ROADM. Furthermore, the switching system may include at least one first WSS optically coupled to a tapping coupler and configured to receive an input optical signal from a first circulator, transmit a drop optical signal to a demultiplexer to drop one or more first wavelength channels, and output a through optical signal.

Moreover, the switching system may include at least one second WSS optically coupled to the at least one first WSS and a multiplexer and configured to receive an add optical signal from the multiplexer to add one or more second wavelength channels, receive the through optical signal from the at least one first WSS, and output an output optical signal to a second circulator. The switching system may further include at least one optical channel monitor (OCM)

configured to monitor the input optical signal received by the at least one first WSS and the output optical signal output by the at least one second WSS.

According to a second aspect of the present disclosure, there is provided a switching system. The switching system may include at least one first WSS optically coupled to a tapping coupler and configured to receive an input optical signal from a first circulator, transmit a drop optical signal to a demultiplexer to drop one or more first wavelength channels, and output a through optical signal. Furthermore, the switching system may include at least one second WSS optically coupled to the at least one first WSS and a multiplexer and configured to receive an add optical signal from the multiplexer to add one or more second wavelength channels, receive the through optical signal from the at least one first WSS, and output an output optical signal to a second circulator.

Moreover, the switching system may include at least one OCM configured to monitor the input optical signal received by the at least one first WSS and the output optical signal output by the at least one second WSS.

3

Figure 15:
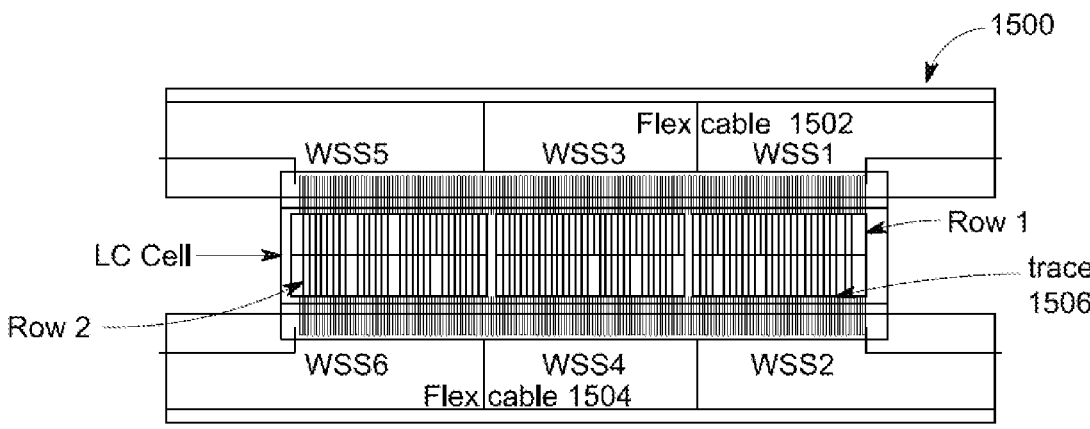

FIG. 15 illustrates a block diagram of the transmissional polarization modulator array in accordance with some examples of the present disclosure.

Figure 16:
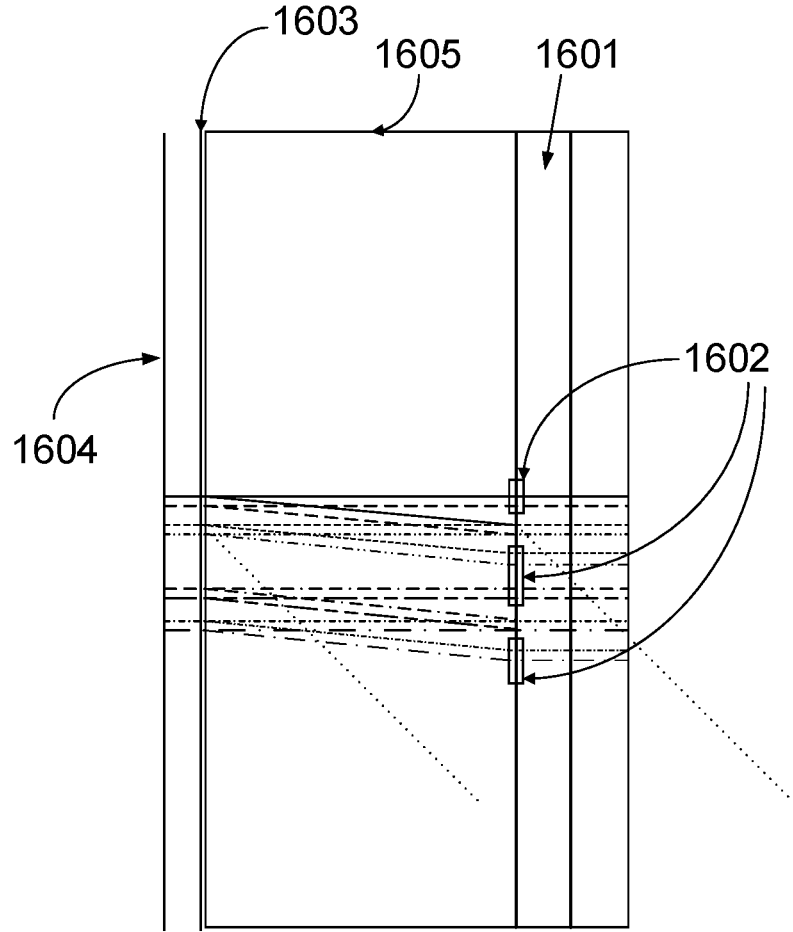

FIG. 16 illustrates a schematic view of the LC transmissive polarization modulator array and corresponding polarization switching optics in accordance with some examples of the present disclosure.

Figure 12:
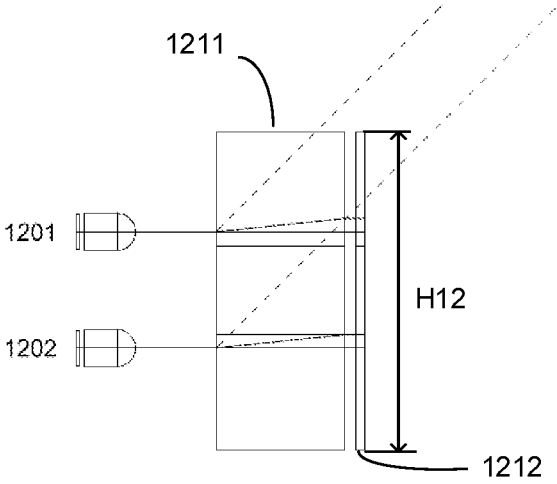
FIG. 12 illustrates another perspective view of two input ports and corresponding polarization conditioning optics in accordance with some examples of the present disclosure.
Figure 17:
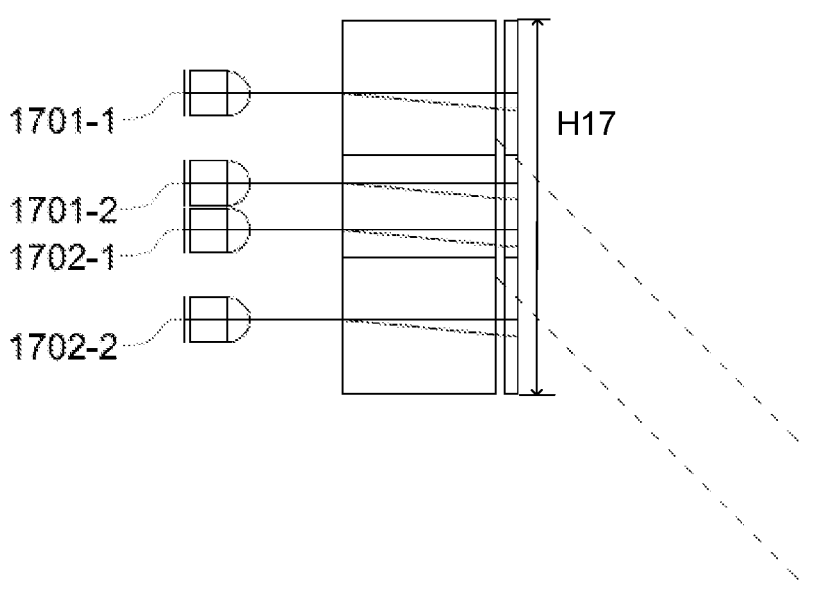

FIG. 17 illustrates four output ports arranged in the same column corresponding to the two input ports shown in FIG. 12 and corresponding polarization conditioning optics in the WSS array optical system in accordance with some examples of the present disclosure.

Figure 11:
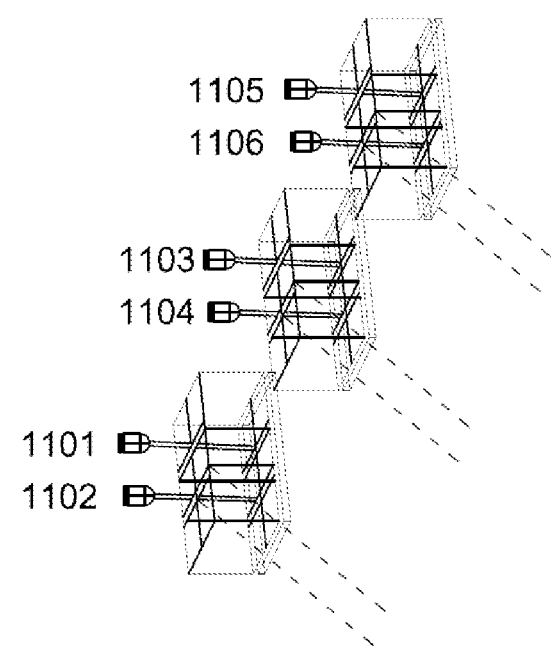
FIG. 11 illustrates six input ports and corresponding polarization conditioning optics in the WSS array optical system in accordance with some examples of the present disclosure.
Figure 18:
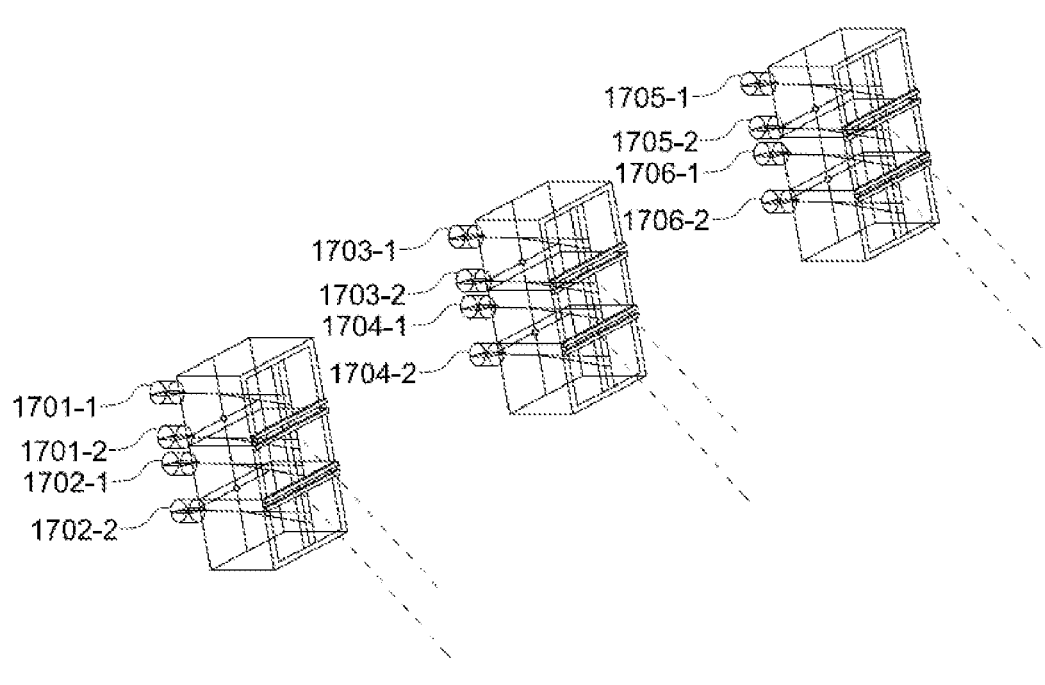

FIG. 18 illustrates twelve output ports corresponding to the six input ports shown in FIG. 11 and corresponding polarization conditioning optics in the WSS array optical system in accordance with some examples of the present disclosure.

Figure 19:
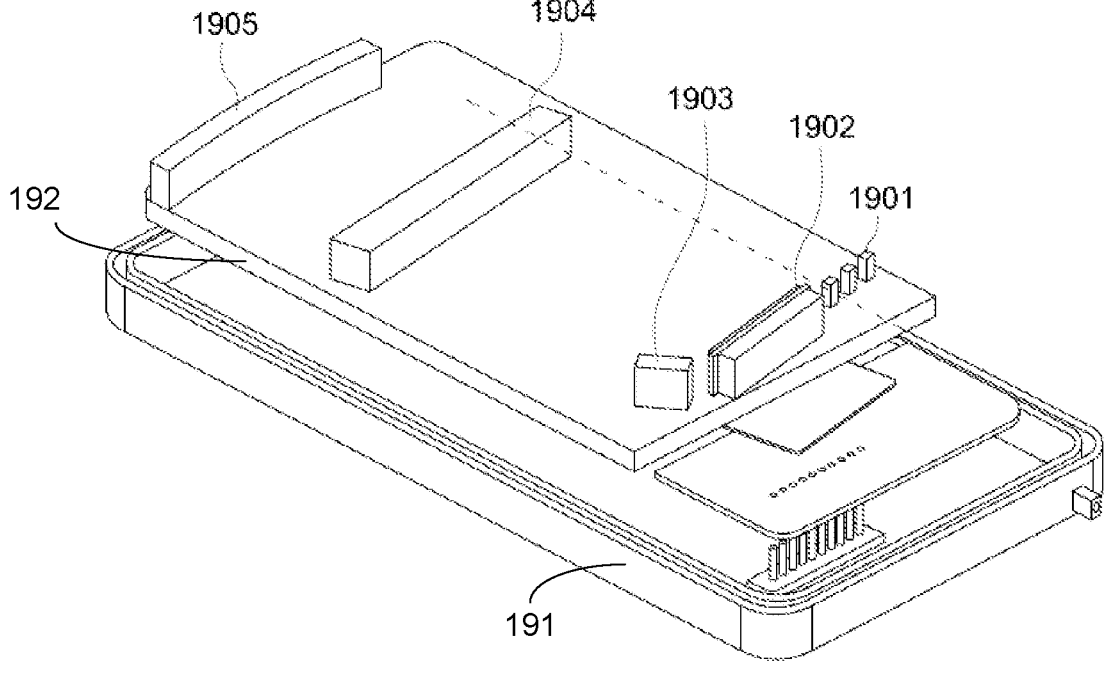

FIG. 19 illustrates a schematic view of the WSS array optical system in a packaging view in accordance with some examples of the present disclosure.

DETAILED DESCRIPTION

In the following description, for the purposes of explanation, numerous specific details are set forth in order to provide a thorough understanding of examples in the present invention. It will be apparent, however, that the examples may be practiced without these specific details. In other instances, well-known structures and devices are shown in block diagram form in order to avoid unnecessarily obscuring the examples.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment," depending on the context.

Figures 1, 2:
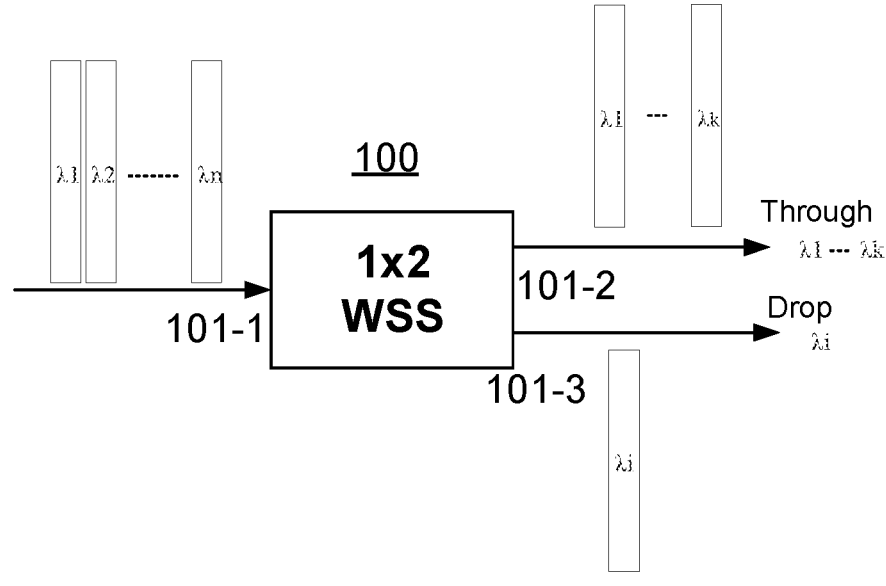
FIG. 1 illustrates a 1×2 WSS in accordance with some examples of the present disclosure.
FIG. 2 illustrates a 2×1 WSS in accordance with some examples of the present disclosure.

FIG. 1 illustrates a 1×2 WSS in accordance with some examples of the present disclosure. The 1×2 WSS 100 may have one input 101-1 and two outputs 101-2 and 101-3. As shown in FIG. 1, the input 101-1 may receive an input optical signal that includes a plurality of wavelength chan-

4 nels $\lambda_1, \ldots, \lambda_n$, where n is a positive integer. The input 101-1 may be a common port. The 1×2 WSS 100 may select k desired wavelength channels and output a through optical signal with k desired wavelength channels at the output 101-2, where k may be a positive integer that is no greater than n. As shown in FIG. 1, the output 101-2 outputs the through optical signal with wavelength channels $\lambda_1, \ldots, \lambda_k$. n may be any positive integer, such as 16, 32. n is not limited to a particular positive integer.

Further, other n–k wavelength channels may be dropped at the output 101-3, i.e., the 1×2 WSS 100 may drop other n–k wavelength channels at the output 101-3 and output a drop optical signal with the other n–k wavelength channels. As shown in FIG. 1, the output 101-3 outputs the drop optical signal with wavelength channel $\lambda_i$, where i is an integer between 1 and n. Both outputs 101-2 and 101-3 may be branch ports.

In some examples, the 1×2 WSS may be bi-directional in nature which may be configured either in 1×2 for wavelength switching and demultiplexing function as shown in FIG. 1 or in 2×1 for wavelength switching and multiplexing function as shown in FIG. 2.

FIG. 2 illustrates a 2×1 WSS in accordance with some examples of the present disclosure. The 2×1 WSS may have two inputs 200-2, 200-3 and one output 200-1. As shown in FIG. 2, the input 200-3 may receive an add optical signal with k wavelength channels and the input 200-2 may receive a through optical signal with other n–k wavelength channels. The 2×1 WSS 200 may multiplex the two inputs and output an output optical signal with wavelength channels $\lambda_1, \ldots, \lambda_n$. As shown in FIG. 2, the 2×1 WSS 200 may receive the through optical signal with wavelength channel $\lambda_1$ at the input 200-2 and the add optical signal with wavelength channels $\lambda_1, \ldots \lambda_k$ at the input 200-3, and output the optical signal with wavelength channel $\lambda_i$ at the output 200-1. The output 200-1 may be a common port. The inputs 200-2, 200-3 may be branch ports. n may be any positive integer, such as 16, 32. n is not limited to a particular positive integer.

In addition to wavelength switching and multiplexing/demultiplexing, a WSS may also provide per wavelength channel power attenuation or adjustment so as to obtain transmitted power balancing or spectrum shaping for optical network performance enhancement.

Figure 3:
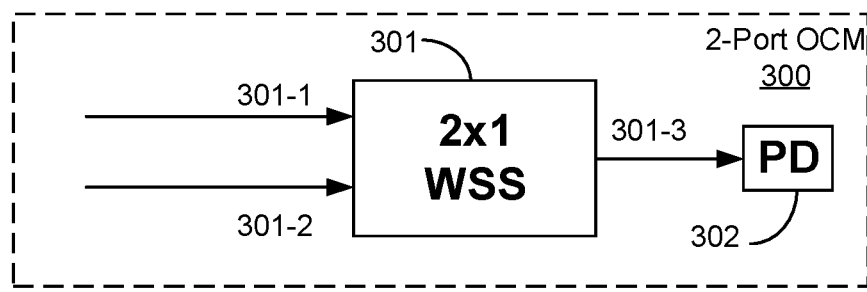
FIG. 3 illustrates a two-port optical channel monitor incorporating a 2×1 WSS and a photo detector in accordance with some examples of the present disclosure.

As shown in FIGS. 1-2, a WSS may pass one or more specific wavelength channels while blocking others, thus a core engine of Optical Channel Monitor (OCM) may be implemented by adding a photo detector (PD) at a common port of a WSS with associated electrical circuits and signal processing unit. FIG. 3 illustrates a two-port OCM incorporating a 2×1 WSS and a PD in accordance with some examples of the present disclosure.

As shown in FIG. 3, the two-port OCM 300 includes the 2×1 WSS 301 and the PD 302. The two-port OCM 300 may obtain performance information about optical signals. For example, the two-port OCM 300 may access the quality of input optical signals by measuring optical characteristics without directly checking the transmitted sequence of bits so as to ensure correct switching in a ROADM system.

Referring to FIG. 3, the 2×1 WSS 301 may have a 2×1 WSS 200 shown in FIG. 2. As shown in FIG. 3, the 2×1 WSS 301 includes two inputs 3014, 301-2 and one output 301-3. The two inputs 301-1, 301-2 may respectively receive two input optical signals to monitor, multiplex the two received input, optical signals, and output an output optical signal. In some examples, the two input optical signals may be respectively two optical signals outputted by two corresponding devices.

The 2×1 WSS 301 may then transmit the output optical signal to the PD 302. The PD 302 may receive the output optical signal transmitted from the 2×1 WSS 301 and monitor if the signal level of the output optical signal proper.

To obtain a rich optical network application and function through a compact, efficient and flexible structure, the present disclosure provides an integrated WSS array using liquid crystal for light polarization manipulation in order to achieve WSS wavelength switching and attenuation. The integrated WSS array may include multiple WSSs. The number of the multiple WSSs may be, but not limited to, 3, 6, etc. The number of the multiple WSSs may be greater than 6. The multiple WSSs may share one single set of optics so as to enable compact module size and low cost. The present disclosure illustrates in figures using an integrated WSS array integrating six WSSs as an example, but the number of the multiple WSSs in the integrated WSS array is not limited to six. Additionally, the present disclosure illustrates in figures using 1×2 WSS and 2×1 WSS as an example, but the WSSs used may not limit to 1×2 or 2×1 WSSs. 1×N or N×1 WSSs may be used in the present disclosure where N is a positive integer no less than 2. That is, a 1×N WSS may be used with one input port, e.g., one COM port, and N output ports, e.g., N branch ports, while N×1 WSS may be used with N input ports, e.g., N branch ports, and one output port, e.g., one COM port.

Figure 4:
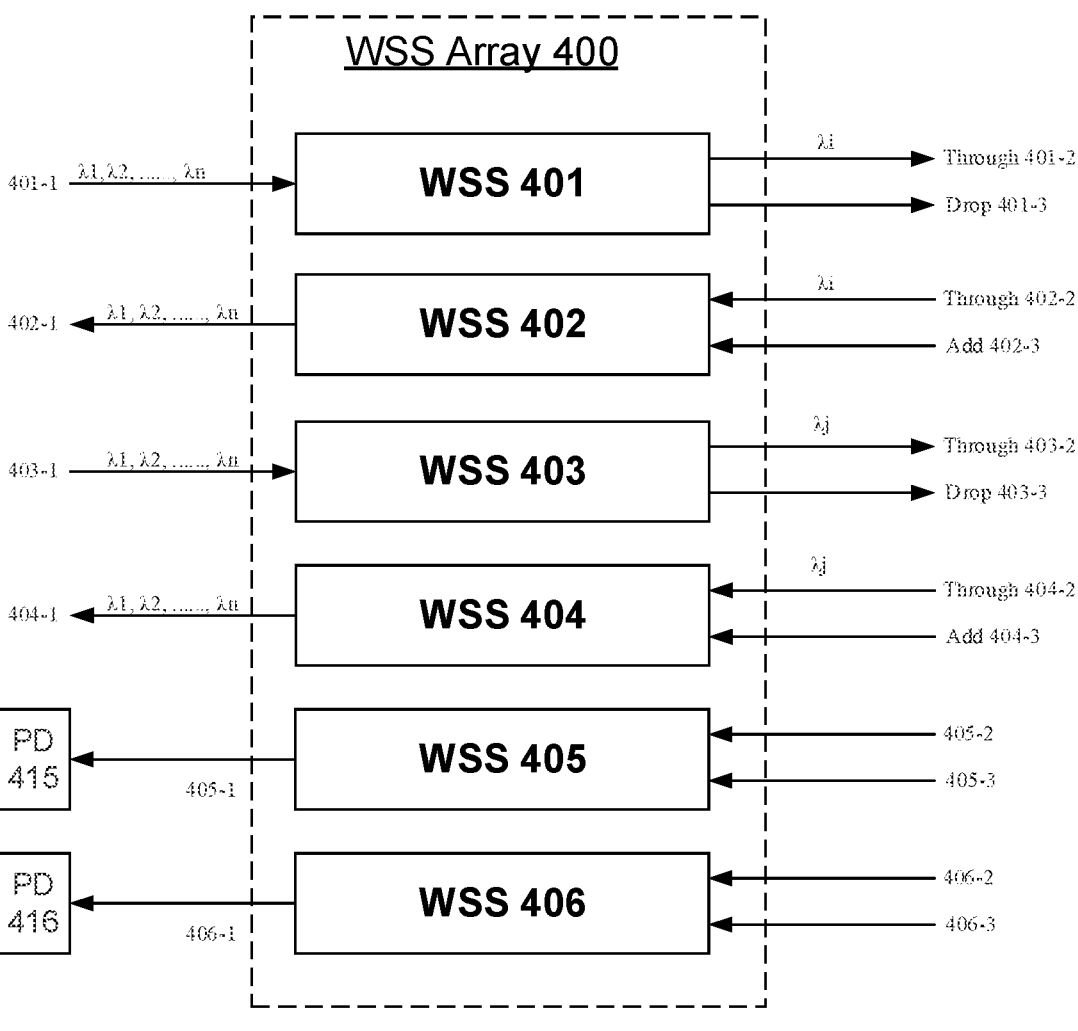
FIG. 4 illustrates a structure diagram of a WSS array in accordance with some examples of the present disclosure.

FIG. 4 illustrates a structure diagram of a WSS array in the switching system in accordance with some examples of the present disclosure. The WSS array 400 includes six WSSs. The six WSSs include WSS 401, WSS 402, WSS 403, WSS 404, WSS 405, and WSS 406. WSS 401 and WSS 403 are respectively 1×2 WSS as shown in FIG. 1, which may also be called Demux WSS. WSS 402 and WSS 404, WSS 405 and WSS 406 are respectively 2×1 WSS as shown in FIG. 2, which may also be called Mux WSS. WSS 405 is optically coupled with PD 415 which detects optical signals transmitted from WSS 405. WSS 406 is optically coupled with PD 416 which detects optical signals transmitted from WSS 406.

Specifically, WSS 401 may receive an optical signal at its input, i.e., common port 401-1, and the optical signal may carry n wavelength channels, such as $\lambda_1, \ldots, \lambda_n$. WSS 402 then may select one or more wavelength channels, such as $\lambda_j$, and output a through optical signal carrying the selected one or more wavelength channels at a first output 401-2 of WSS 401. Other wavelength channels may be dropped at a second output 401-3 of WSS 401. That is, WSS 402 outputs a drop optical signal carrying other wavelength channels at the second output 401-3.

Furthermore, WSS 402 may receive the through optical signal carrying the selected one or more wavelength channels from WSS 401 at its input 402-2 and receive an add optical signal carrying one or more add wavelength channels at its input 402-3. The two inputs 402-2 and 402-3 may be branch ports. WSS 402 may then multiplex the through optical signal and the add optical signal, and output an output optical signal at its output 402-1. The output optical signal may carry all wavelength channels including the selected one or more wavelength channels and the one or more add wavelength channels. The inputs 402-2 and 402-3 may be branch ports and the output 402-1 may be common port.

Moreover, similar to WSS 401, WSS 403 may receive an optical signal at its input, i.e., common port 403-1, and the optical signal may carry n wavelength channels, such as $\lambda_1, \ldots, \lambda_n$. WSS 403 then may select one or more wavelength channels, such as $\lambda_j$ where j is an integer between 1 and n, and output a through optical signal carrying the selected one or more wavelength channels at a first output 403-2 of WSS 403. Other wavelength channels may be dropped at a second output 403-3 of WSS 403. That is, WSS 403 outputs a drop optical signal carrying other wavelength channels at the second output 403-3. The two outputs 403-2 and 403-3 may be branch ports.

Similarly, WSS 404 may receive the through optical signal carrying the selected one or more wavelength channels, such as $\lambda_j$, from WSS 403 at its input 404-2 and receive an add optical signal carrying one or more add wavelength channels at its input 404-3. The two inputs 404-2 and 404-3 may be branch ports. WSS 404 may then multiplex the through optical signal and the add optical signal, and output an output optical signal at its output 404-1. The output optical signal may carry all wavelength channels including the selected one or more wavelength channels and the one or more add wavelength channels. The inputs 404-2 and 404-3 may be branch ports and the output 404-1 may be common port.

In some examples, the WSS array may include WSS 405 and WSS 406. Each of WSS 405 and WSS 406 is optically coupled to one PD. As shown in FIG. 4, WSS 405 is optically coupled to PD 415 and WSS 406 is optically coupled to PD 416. WSS 405 may receive two optical signals at its inputs 405-2 and 405-3 and multiplex the two optical signals. WSS 405 then output an output optical signal at its output 405-1 and transmits the output optical signal to PD 415 to detect the signal level of the output optical signal to monitor if the two received optical signals proper. In some examples, the two optical signals may be respectively associated with the optical signal that WSS 401 received at its input 401-1 and the output optical signal outputted by WSS 402 at its output 402-1.

In some examples, WSS 406 may receive two optical signals at its inputs 406-2 and 406-3 and multiplex the two optical signals. WSS 406 then output an output optical signal at its output 406-1 and transmits the output optical signal to PD 416 to detect the signal level of the output optical signal to monitor if the two received optical signals proper. In some examples, the two optical signals may be respectively associated with the optical signal that WSS 403 received at its input 403-1 and the output optical signal outputted by WSS 404 at its output 404-1.

Figure 5:
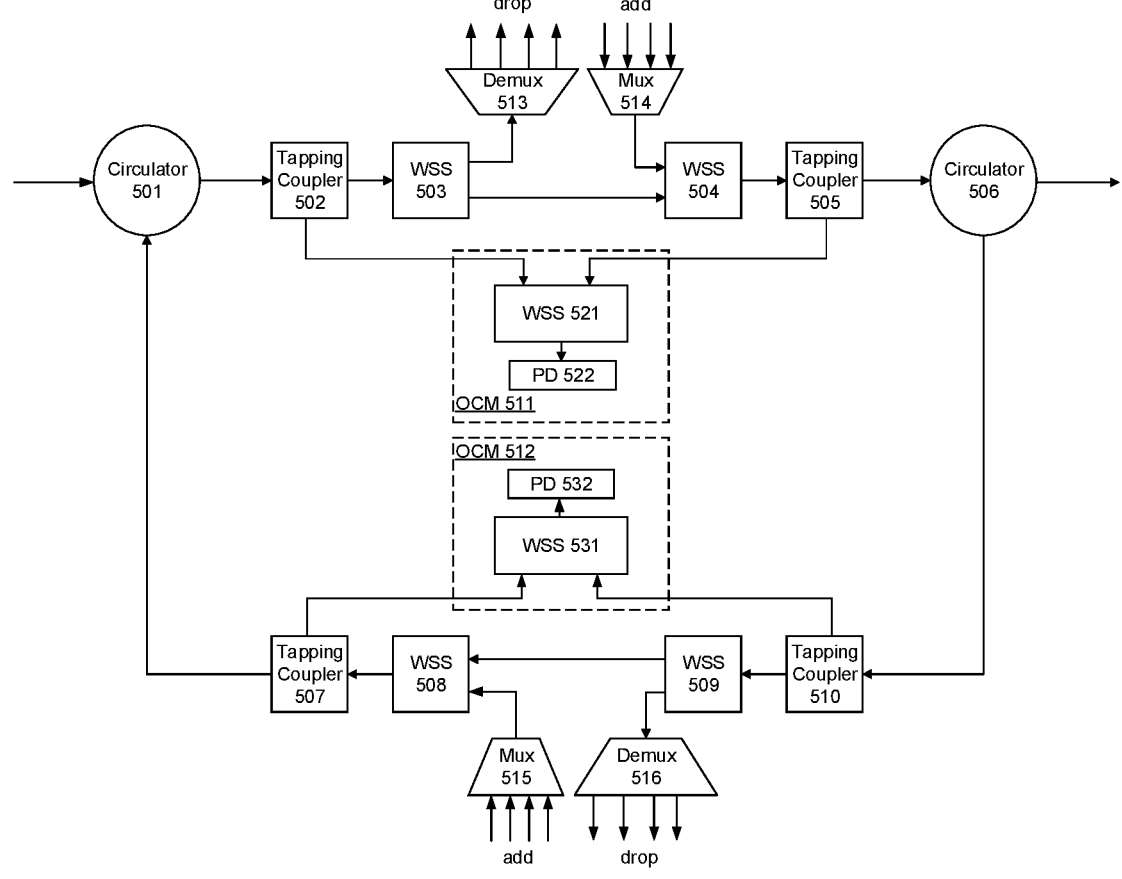
FIG. 5 illustrates a structure diagram of a switching system configured to route optical signals through the ROADM system in accordance with some examples of the present disclosure.

FIG. 5 illustrates a structure diagram of a switching system configured to route optical signals through the ROADM system in accordance with some examples of the present disclosure. The switching system shown in FIG. 5 may include a WSS 503, a WSS 504, a WSS 508, a WSS 509, an OCM 511, and an OCM 512. WSS 503 may be the same as WSS 401, WSS 504 may be the same as WSS 402, WSS 509 may be the same as WSS 403, and WSS 508 may be the same as WSS 404. OCM 511 may include a WSS 521 and a PD 522. And OCM 512 may include a WSS 531 and a PD 532. WSS 521 may be the same as WSS 405 and PD 522 may be the same as PD 415. WSS 522 may be the same as WSS 406 and PD 532 may be the same as PD 416.

As shown in FIG. 5, a tapping coupler 502 extracts a percentage of light energy of its input optical signal and transmits the optical signal with the extracted percentage of light energy to OCM 511 to monitor. The tapping coupler 502 receives the input optical signal from a circulator 501 as shown in FIG. 5. The tapping coupler 502 may be a passive optical traffic analysis point (TAP) that monitors optical networks. As a passive TAP, the tapping coupler 502 requires no power and has no electrical component. In some examples, the tapping coupler 502 may extract 1% of the light energy of its input signal and transmit to OCM 511 to monitor. The percentage of light energy here may be, but not limited to, 1%, 2%, 10%, etc. of the light energy of the input optical signal.

Furthermore, the tapping coupler 502 may transmit the input optical signal received from the circulator 501 to WSS 503. WSS 503 may demultiplex the input optical signal and transmit a through optical signal to WSS 504 and a drop optical signal to demultiplexer 513. The input optical signal may carry multiple wavelength channels. Similar to WSS 401, WSS 503 may drop one or more wavelength channels at one output and transmit the optical signal carrying the one or more wavelength channels that are dropped to the demultiplexer 513. In addition, WSS 503 may transmit the through optical signal carrying other wavelength channels to WSS 504. WSS 504, similar to WSS 402 as shown in FIG. 4, may receive the through optical signal from WSS 503 and also receive an add optical signal carrying one or more wavelength channels added from a multiplexer 514. WSS 504 may multiplex the through optical signal and the add optical signal to output an output optical signal. WSS 504 may transmit the output optical signal to the tapping coupler 505.

In some examples, the tapping coupler 505 may extract a percentage of light energy of the output optical signal that is received from WSS 504 and transmit an optical signal with the extracted percentage of light energy to OCM 511 to monitor. The tapping coupler 505 may be also a passive optical TAP.

In some examples, OCM 511 may include WSS 521 and PD 522. WSS 521 may receive both the extracted signal that tapping coupler 502 extracts as one input of WSS 521 and the extracted signal that tapping coupler 505 extracts at the other input of WSS 521. WSS 521 may then output an output optical signal at its output and transmits the output optical signal to PD 522 to detect the signal level of the output optical signal to monitor if the two received optical signals proper.

Furthermore, the tapping coupler 505 may transmit the output optical signal outputted by WSS 504 to a circulator 506. The circulator 506 may transmit an optical signal to a tapping coupler 510 as shown in FIG. 5.

The tapping coupler 510 extracts a percentage of light energy of its input optical signal and transmits an optical signal with the extracted percentage of light energy to OCM 512 to monitor. The tapping coupler 510 receives its input optical signal from the circulator 506 as shown in FIG. 5. The tapping coupler 510 may be a passive optical TAP that monitors optical networks. In some examples, the tapping coupler 510 may extract 1% of the light energy of its input signal and transmit to OCM 512 to monitor. The percentage may be, but not limited to, 1%, 2%, 10%, etc.

Furthermore, the tapping coupler 510 may transmit the input optical signal received from the circulator 506 to WSS 509. WSS 509 may demultiplex the input optical signal and transmit a through optical signal to WSS 508 and a drop optical signal to demultiplexer 516. The input optical signal may carry multiple wavelength channels. Similar to WSS 403, WSS 509 may drop one or more wavelength channels at one output and transmit the optical signal carrying the one or more wavelength channels that are dropped to the demultiplexer 516. In addition, WSS 509 may transmit the through optical signal carrying other wavelength channels to WSS 508. WSS 508, similar to WSS 404 as shown in FIG. 4, may receive the through optical signal from WSS 509 and also receive an add optical signal carrying one or more wavelength channels added from multiplexer 515. WSS 508 may multiplex the through optical signal and the add optical signal to output an output optical signal. WSS 508 may transmit the output optical signal to the tapping coupler 507.

In some examples, the tapping coupler 507 may extract a percentage of light energy of the output optical signal that is received from WSS 508 and transmit the extracted percentage to OCM 512 to monitor. The tapping coupler 507 may be also a passive optical TAP.

In some examples, the circulator 501 and the circulator 506 may be a same circulator that is bi-directional.

In some examples, the multiple WSSs in the integrated WSS array share one single set of optics so as to enable compact module size and low cost. The combination of the multiple WSSs and the shared one single set of optics constitute parts of a switching system, which may be called WSS array optical system or WSS array optical core system. The WSS array optical system may include a plurality of ports. Each port may include an optical fiber and a collimator coupled to the optical fiber. The plurality of ports may include a plurality of input ports and a plurality of output ports.

FIG. 11 illustrates six input ports in the WSS array optical core system in accordance with some examples of the present disclosure. As shown in FIG. 11, six input ports 1101, 1102, 1103, 1104, 1105, 1106 are arranged in two rows and three columns. The arrangement of the six input ports above may not limited to the arrangement shown in FIG. 11.

Figure 6:
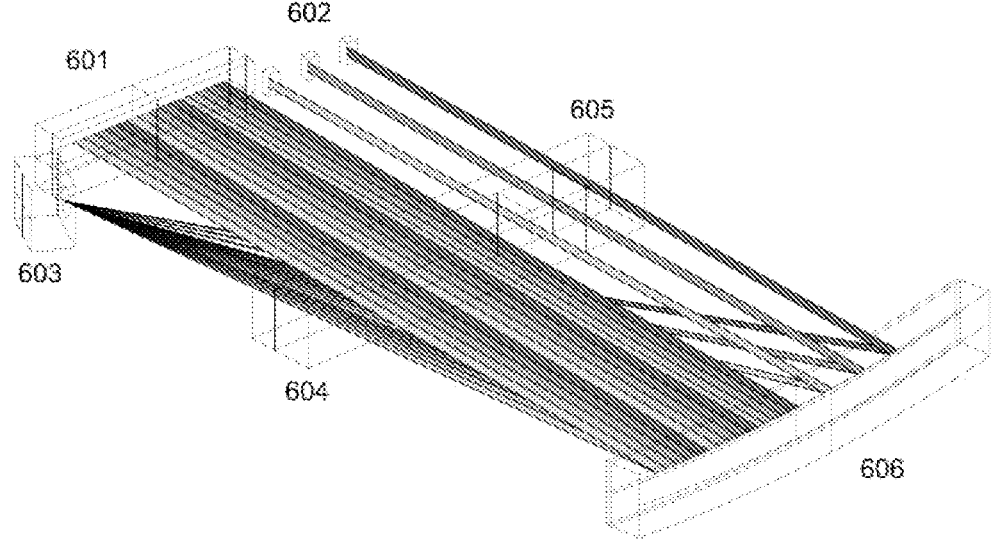
FIG. 6 illustrates a schematic view of a WSS array optical system in accordance with some examples of the present disclosure.

In some examples, the input port 1101 may correspond to WSS 401 as shown in FIG. 4 or WSS 503 in FIG. 5. Further, the input port 1102 may correspond to WSS 402 as shown in FIG. 4 or WSS 504 in FIG. 5, the input port 1103 may correspond to WSS 403 as shown in FIG. 4 or WSS 509 in FIG. 5, the input port 1104 may correspond to WSS 404 as shown in FIG. 4 or WSS 508 in FIG. 5. Moreover, the input port 1105 may correspond to WSS 521 in OCM 511 and the input port 1106 may correspond to WSS 531 in OCM 512. Each input port may transmit a light beam to polarization condition optics 602 as shown in FIG. 6.

In some examples, each of the six input ports 1101, 1102, 1103, 1104, 1105, 1106 may include one optical fiber and a collimator coupled to the optical fiber. A collimator of an input port may be a common port collimator that is corresponding to a common port of a respective WSS.

Figure 9:
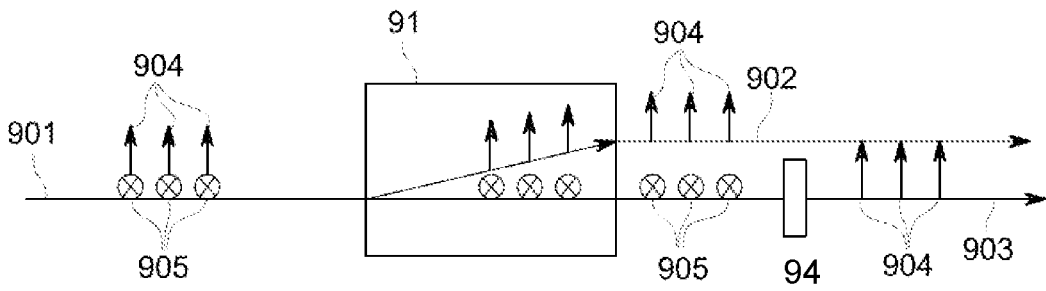
FIG. 9 illustrates the polarization condition optics shown in FIGS. 6-8 in accordance with some examples of the present disclosure.

In some examples, each input port may transmit an input optical beam from its collimator to the polarization condition optics 602. The input optical beam from one collimator may have any random polarization. Such input optical beam may include two optical components 902 and 903 having orthogonal polarization as shown at 904 and 905, respectively. Polarization condition optics 602 are provided such as a birefringent walk-off crystal 91, as shown in FIG. 9, to spatially separate the two optical components 902, 903 of the input optical beam 901 as a result of their orthogonal polarizations 904, 905. The illustrated orientations of the polarization states 902, 903 are exemplary only and may have any orientations that are orthogonal. In operation, the first optical component 902 passes through the walk-off crystal 91 without changing its path. The second optical component 903 is redirected along a propagation angle based upon the characteristics of the walk-off crystal 91.

In some examples, referring to FIG. 9, a half-wave plate 94 may be aligned with one of the optical components, e.g., 903, along the path of the walk-off crystal 91 and operates to rotate the polarization of the optical component passing therethrough by 90° so that the first and second optical components 902, 903 have the same polarization, e.g., 904.

Figure 10:
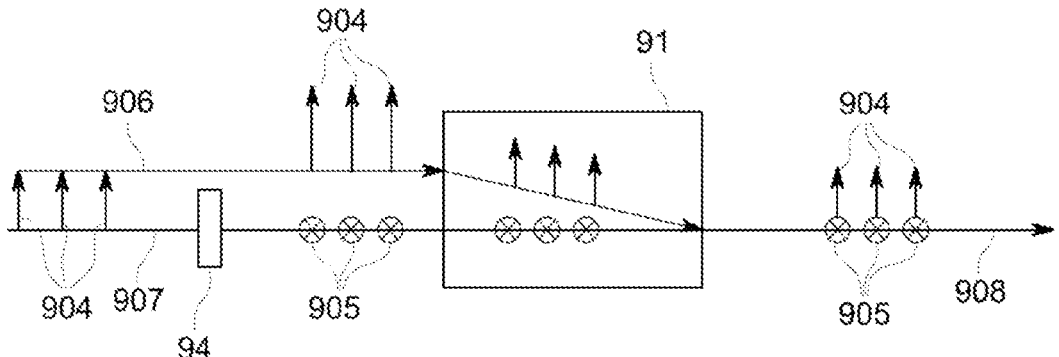
FIG. 10 illustrates the polarization condition optics shown in FIGS. 6-8 in a manner to combine light beams in accordance with some examples of the present disclosure.

As shown in FIG. 10, the birefringent walk-off crystal 91 and the half-wave plate 94 are bi-directional and thus will change the polarization and combine light beams, e.g., 906, 907, in a manner opposite the separation shown in FIG. 9 to form a single beam 908 having two orthogonal polarizations 904, 905.

Figure 7:
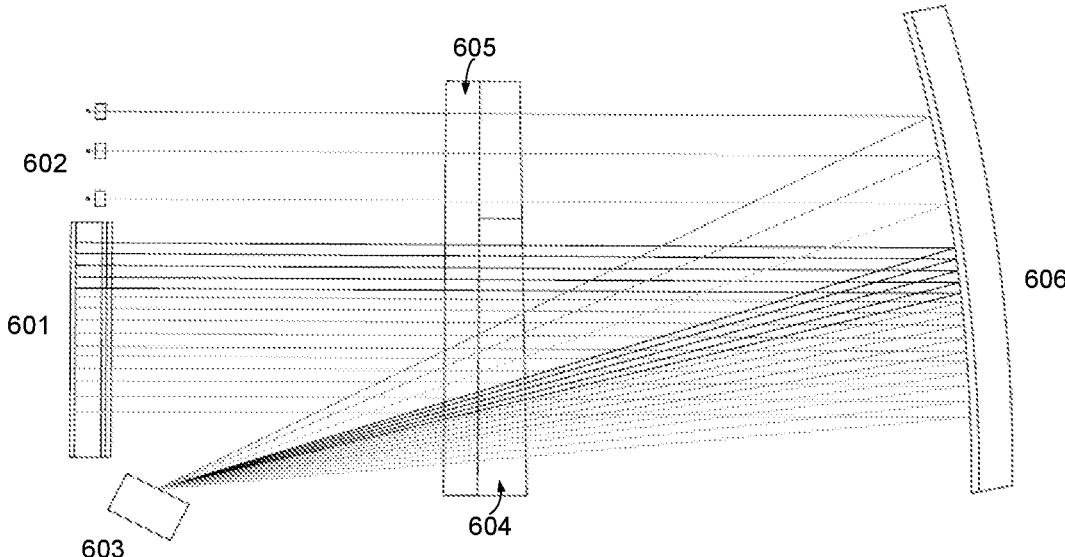
FIG. 7 illustrates a side view of the WSS array optical system of FIG. 6 in accordance with some examples of the present disclosure.

As shown in FIGS. 6-7, the WSS array optical system may further include the polarization condition optics 602, a port switch direction cylindric lens 605 which is a cylindrical lens in port switch direction, a wedge compensator 604, a dispersion direction cylindric spectrum lens 606, a spectrum dispersion component 603, a liquid crystal (LC) transmissive polarization modulator and polarization switching optics 601. FIG. 6 illustrates a schematic view of the WSS array optical system in accordance with some examples of the present disclosure. FIG. 7 illustrates a side view of the WSS array optical system of FIG. 6 in accordance with some examples of the present disclosure. The arrangement and sizes of the components in the WSS array optical system in FIGS. 6-7 are not limited to the particular sizes and distances as illustrated in FIGS. 6-7 and may be scaled larger or smaller. In some examples, the distances between the components and sizes of the components in the WSS array optical system may follow a scale, but not limited to a specific scale. For example, the distance between the polarization condition optics 602 and the port switch direction cylindric lens 605 and the distance between the LC transmissive polarization modulator and polarization switching optics 601 and the wedge compensator 604 may be respectively within a range of 40 mm and 60 mm, and the width of the LC transmissive polarization modulator and polarization switching optics 601 may be within a range of 25 mm and 30 mm Specifically, the distance between the polarization condition optics 602 and the port switch direction cylindric lens 605 and the distance between the LC transmissive polarization modulator and polarization switching optics 601 and the wedge compensator 604 may be 50 mm, and the width of the LC transmissive polarization modulator and polarization switching optics 601 may be 28 mm. Furthermore, the distance between the port switch direction cylindric lens 605 and the dispersion direction cylindric spectrum lens 606 may be within a range of 50 mm and 70 mm Specifically, the distance between the port switch direction cylindric lens 605 and the dispersion direction cylindric spectrum lens 606 may be 60 mm.

Figure 8:
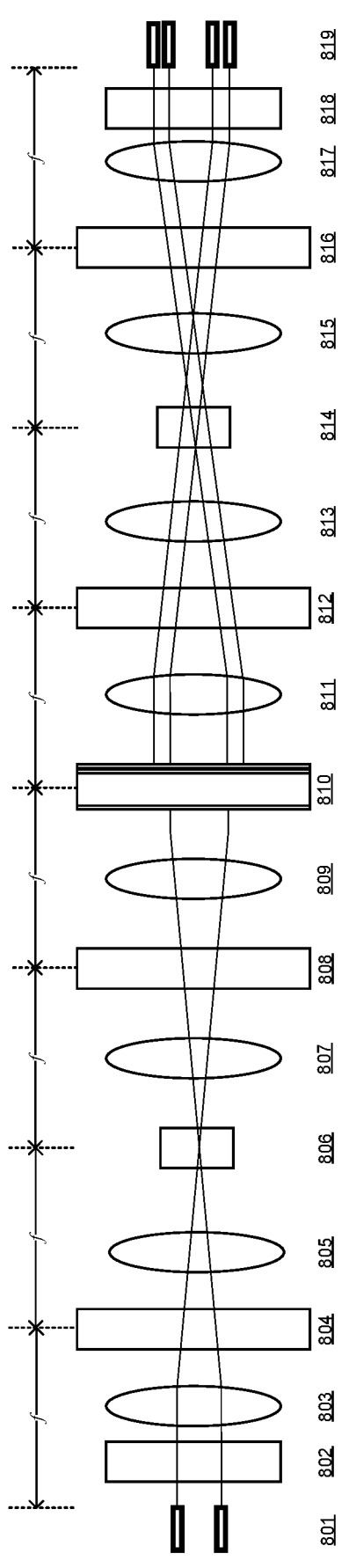
FIG. 8 illustrates a schematic view of the WSS array optical system of FIGS. 6-7 in an unfolded view in accordance with some examples of the present disclosure.

FIG. 8 illustrates a schematic view of the WSS array optical system of FIGS. 6-7 in an unfolded view in accordance with some examples of the present disclosure. As shown in FIG. 6, the wedge compensator 604 may be a compensator on one side of the port switch direction cylindric lens 605 and may import a particular path difference to two input light beams or to make an already existing path difference equal to zero or a particular constant value. The thickness of the wedge compensator 604 may increase from the upper side to the lower side. The wedge compensator 604 does not have optical power. As shown in FIG. 8, the input light beams transmitted from the collimators 801 of the input ports respectively pass through the polarization condition optics, the port switch direction cylindric lens, the dispersion direction cylindric spectrum lens, the spectrum dispersion component, and the LC transmissive polarization modulator and the plurality of polarization switching optics. FIGS. 6-7, as well as FIGS. 11-12 and 16-19 show scales corresponding to each component in FIGS. 6-7 but the disclosure is not to be limited to any particular size and may be scaled larger or smaller.

Specifically, common port collimators 801 are respectively collimators of two input ports in a same column as shown in FIG. 11. For example, the two common port collimators 801 may be collimators of input ports 1101 and 1102, collimators of input ports 1103 and 1104, or collimators of input ports 1105 and 1106.

Polarization condition optics 802 and 818 are respectively illustrating the polarization condition optics 602 shown in FIGS. 6-7. Port switch direction cylindric lens 803, 805, 807, 809, 811, 813, 815, 817 are respectively illustrating the port switch direction cylindric lens 605 shown in FIGS. 6-7. Dispersion direction spectrum lens 804, 808, 812, 816 are respectively illustrating the dispersion direction cylindric spectrum lens 606 shown in FIGS. 6-7. Dispersion components 806, 814 are respectively illustrating the spectrum dispersion component 603 shown in FIGS. 6-7. LC and polarization switch optics 810 may illustrate the LC transmissive polarization modulator and the polarization switching optics 601 shown in FIGS. 6-7. The dispersion components 806, 814 may be spectrum dispersion grating.

As shown in FIG. 8, after the input light beams respectively pass through the polarization condition optics 802, the port switch direction cylindric lens 803, the dispersion direction spectrum lens 804, the port switch direction cylindric lens 805, the dispersion component 806, the port switch direction cylindric lens 807, the dispersion direction spectrum lens 808, the port switch direction cylindric lens 809, the LC and polarization switch optics 810, the port switch direction cylindric lens 811, the dispersion direction spectrum lens 812, the port switch direction cylindric lens 812, the dispersion direction spectrum lens 813, the dispersion components 814, the dispersion direction spectrum lens 815, the port switch direction cylindric lens 816, the dispersion direction spectrum lens 817, and the polarization condition optics 818, four branch port collimators 819 may respectively receive output light beams. The four branch port collimators 819 may be arranged in the same column different rows, as shown in FIG. 17.

Specifically, the four branch port collimators 819 may respectively collimators of output ports 1701-1, 1701-2, 1702-1, and 1702-2, output ports 1703-1, 1703-2, 1704-1, and 1704-2, or output ports 1705-1, 1705-2, 1706-1, and 1706-2, as shown in FIG. 18. FIG. 17 illustrates another perspective view of four output ports 1701-1, 1701-2, 1702-1, 1702-2 arranged in a column and corresponding polarization conditioning optics. The arrangement of output ports 1703-1, 1703-2, 1704-1, and 1704-2 and the arrangement of output ports 1705-1, 1705-2, 1706-1, and 1706-2 may be the same as the arrangement of output ports 1701-1, 1701-2, 1702-1 and 1702-2. The distances between the components and sizes of the components including the output ports and the polarization conditioning optics in FIGS. 17-18 are not limited to the particular sizes and distances as illustrated in FIGS. 17-18 and may be scaled larger or smaller. In some examples, the arrangement and sizes of the components in FIGS. 17-18 may follow a scale, but not limited to a specific scale. For example, the distance between an output port and a corresponding conditioning optics may be within a range of 1 mm and 4 mm, and the height of the conditioning optics may be within a range of 3 mm and 8 mm More specifically, the distance between an output port and a corresponding conditioning optics may be within a range of 1 mm and 2 mm, and the height of the conditioning optics may be within a range of 3 mm and 5 mm Most specifically, the distance between an output port and a corresponding conditioning optics may be 1.3 mm and the height H17 of the conditioning optics may be 3.2 mm.

As shown in FIG. 8, in some examples, the distance between a dispersion component and a dispersion direction spectrum lens may equal to the focal length f of the dispersion direction spectrum lens. For example, the distance between the dispersion component 806 and the dispersion direction spectrum lens 804 or 808 is f, the distance between the dispersion component 814 and the dispersion direction spectrum lens 812 or 816 is f Additionally, the distance between the LC and polarization switch optics 810 and the dispersion direction spectrum lens 812 or 808 is f, the distance between the dispersion direction spectrum lens 804 and the common port collimators 801 is f, and the distance between the dispersion direction spectrum lens 816 and the branch port collimators 819 is f. As shown in FIGS. 6-7, the WSS array optical core system is folded by the dispersion direction cylindric spectrum lens 606 and the port switch direction cylindric lens 605.

As shown in FIG. 8, the two input light beams transmitted from the common port collimators 801, after parallelly passing through the port switch direction cylindric lens 803, focus to the dispersion component 806. After passing through the port switching direction cylindric lens 807, dispersion direction spectrum lens 808, the dispersion direction spectrum lens 809, the two input light beams are projected parallelly to the LC and polarization switch optics 810. The LC and polarization switch optics 810 may separate each input light beam into two parallel output light beams that have same polarization. The beam size of the two output light beams is equal to the beam size of the input light beam.

As shown in FIGS. 6-7 and 11, there are six input ports 1101, 1102, 1103, 1104, 1105, 1106 and, thus, there are six input light beams projected to the WSS array optical system. The dispersion component 806 may disperse the six input light beams into six spectrums in two rows, i.e., three light beams in each row. After port separation in dispersion direction is decided, grating line density may be designated to avoid overlapping from neighbor spectrum.

As shown in FIG. 11, six input ports 1101, 1102, 1103, 1104, 1105, 1106 are arranged in two rows and three columns. In some examples, the six input ports may be common ports. The input ports 1101, 1103, and 1105 are arranged in the first row while the input ports 1102, 1104, and 1106 are arranged in the second row below the first row. The arrangement of the six input ports above may not be limited to the arrangement shown in FIG. 11. The distances between the components and sizes of the components including the input ports and the polarization conditioning optics shown in FIGS. 11-12 are not limited to the particular sizes and distances as illustrated in FIGS. 11-12 and may be scaled larger or smaller. In some examples, the arrangement and sizes of the components shown in FIGS. 11-12 may follow a scale, but not limited to a specific scale. For example, the distance between an input port and a corresponding conditioning optics may be within a range of 1 mm and 4 mm, and the height of the conditioning optics may be within a range of 3 mm and 8 mm More specifically, the distance between an input port and a corresponding conditioning optics may be within a range of 1 mm and 2 mm, and the height of the conditioning optics may be within a range of 3 mm and 5 mm Most specifically, the distance between the conditioning optics corresponding to the input ports 1101 and 1102 and the conditioning optics corresponding to the input ports 1105 and 1106 may be 15 mm, the distance between an input port and a corresponding conditioning optics may be 1.3 mm, and the height H12 of the conditioning optics may be 3.2 mm.

FIG. 12 illustrates another perspective view of two input ports 1201, 1202 and the polarization conditioning optics. For example, the two input ports 1201, 1202 may be the two input ports 1101, 1102 arranged in a same column and different rows, i.e., the first row and the second row. The two input ports 1201, 1202 may be the two input ports 1103, 1104 arranged in a same column and different rows, i.e., the first row and the second row. The two input ports 1201, 1202 may be the two input ports 1105, 1106 arranged in a same column and different rows, i.e., the first row and the second row.

As shown in FIG. 12, the input light beam transmitted from the input port 1201 or 1202 may pass through the walk-off crystal 1211 and the half-wave plate 1212 and then two light beams having same polarization will be outputted from the half-wave plate 1212. The walk-off crystal 1211 may be same as the walk-off crystal 91 and the half-wave plate 1212 may be same as the half-wave plate 94 as shown in FIG. 9.

Figure 13:
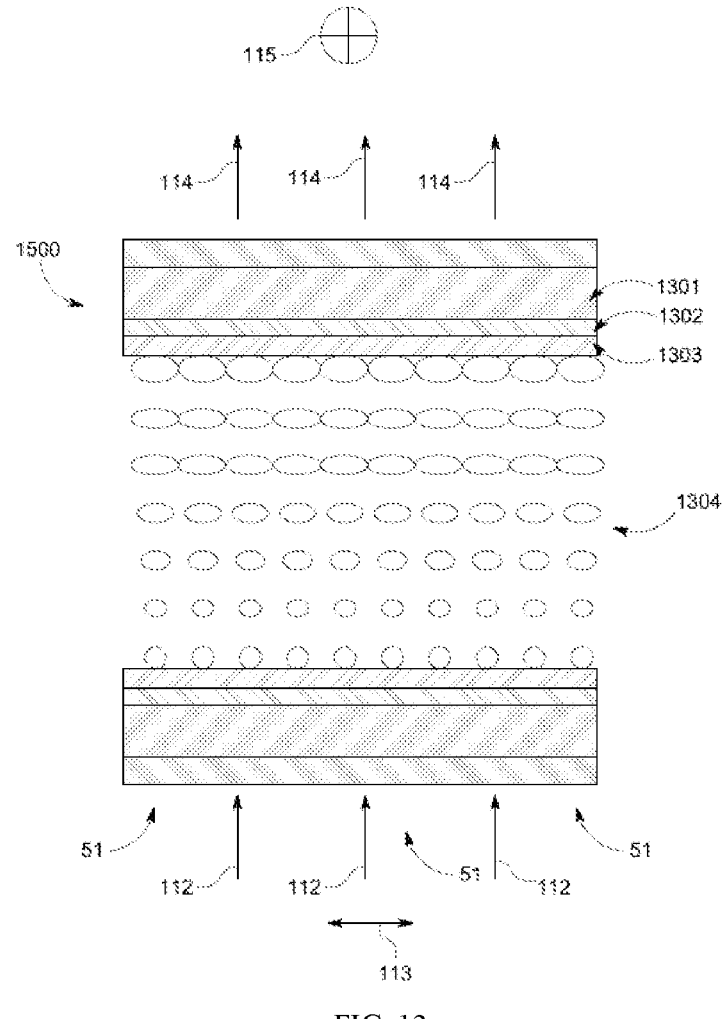
FIG. 13 illustrates a schematic view of a transmissional polarization modulator array of the WSS array optical system of FIGS. 6-7 in an off or low voltage state in accordance with some examples of the present disclosure.

FIG. 13 is a schematic view of a transmissional polarization modulator array of the WSS array optical system of FIG. 6 in an off or low voltage state. The LC transmissive polarization modulator and the polarization switching optics 601 may include a transmissional polarization modulator array 1500 as shown in FIG. 15. The transmissional polarization modulator array 1500 may include a first flex cable 1502 and a second flex cable 1504. The first flex cable 1502 may be coupled to a first row (Row 1 shown in FIG. 15) of LC elements, i.e., LC pixels or LC pixel arrays. The second flex cable 1504 may be coupled to a second row (Row 2 shown in FIG. 15) of LC pixels. The first row of LC pixels may include three switch controlling sections that may respectively control three WSSs including WSS 1, WSS 3, and WSS 5. Referring to FIG. 4, WSS 1 may be WSS 401, WSS 3 may be WSS 403, WSS 5 may be WSS 405.

Furthermore, the second row of LC pixels may include three switch controlling sections that may respectively control three WSSs including WSS 2, WSS 4, and WSS 6. Referring to FIG. 4, WSS 2 may be WSS 402, WSS 4 may be WSS 404, WSS 6 may be WSS 406. Each of the six switch controlling sections respectively controlling WSS 1, WSS 2, WSS 3, WSS 4, WSS 5, and WSS 6 may be enclosed with trace 1506. The six switch controlling sections may be sealed in a same cell. The trace 1506 may include gold trace on ground plate to reduce electrical resistance of ground optical coating, e.g., indium Tin Oxide (ITO). The trace 1506 may also include heater trace which may accurately control temperature of the LC cell. Each flex cable, 1502 or 1504, may include a fan-out trace turn of 90 degrees to avoid blocking incoming light beams. The trace 1506 may include a plurality of electric wires transmitting signals within the cell as shown in FIG. 15.

Referring to FIG. 13, FIG. 13 shows the transmissional polarization modulator array 1500 of the WSS array optical system of FIG. 6 in an off or low voltage state. As shown in FIG. 13, the transmissional polarization modulator array 1500 may include glass substrate 1301, ITO layer 1302, and orientation layer 1303 on both sides of cells and LC pixels. Three cells 51 of the transmissional polarization modulator array 1500 are depicted with each cell in its off state. Input light beams 112 each have a polarization according to a first orientation as indicated at 113 enter the transmissional polarization modulator array 1500. The polarization of the input light beams 112 is rotated 90° so that the output light beams 114 exit the transmissional polarization modulator array 1500 with an orthogonal polarization as indicated at 115.

Figure 14:
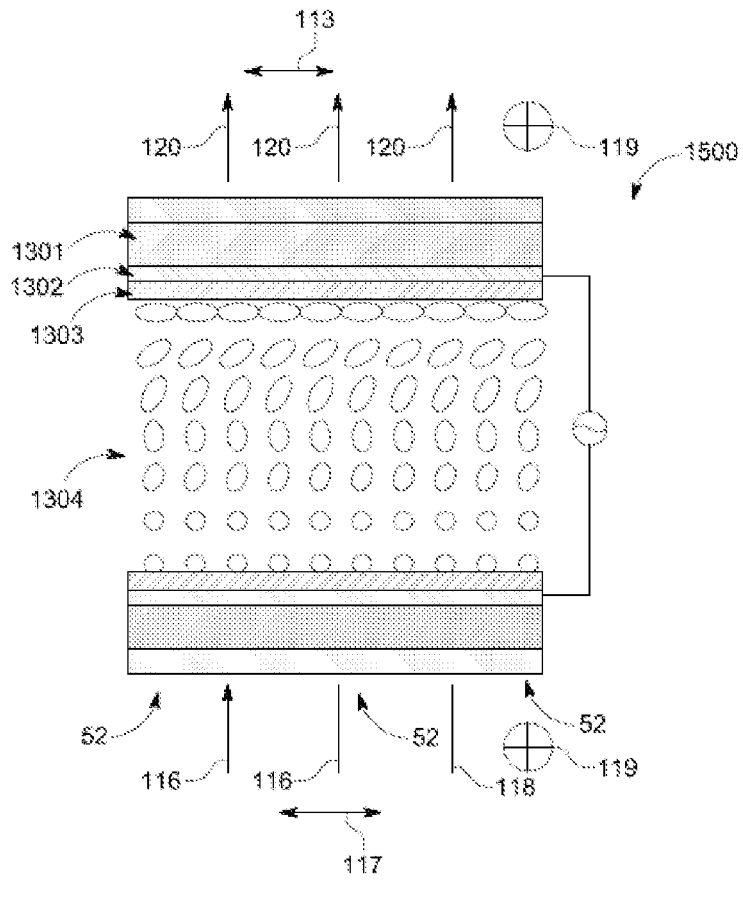
FIG. 14 illustrates the transmissional polarization modulator array of FIG. 13 in an on or high voltage state in accordance with some examples of the present disclosure.

FIG. 14 illustrates the transmissional polarization modulator array of FIG. 13 in an on or high voltage state. As shown in FIG. 13, each of the cells 52 of the transmissional polarization modulator array 1500 is depicted in its on state. Two input light beams 116 have a polarization according to a first orientation as indicated at 117 and a third input beam 118 has a second, orthogonal polarization as indicated at 119. The polarization of the input light beams 116, 118 do not undergo any rotation as they pass through the transmissional polarization modulator array 1500 so the output light beams 120 exit the transmissional polarization modulator array 1500 with the same polarization.

In some examples, the transmissional polarization modulator array 1500 may have two states. In the first state, the transmissional polarization modulator array 1500 behaves like a piece of glass where beam polarization state will keep in the same state. That is, a voltage exceeding a threshold is applied to the transmissional polarization modulator array 1500, as shown in FIG. 14, and, thus, light beams pass through the transmissional polarization modulator array 1500 without changing the polarization. In the second state, the transmissional polarization modulator array 1500 behaves like a half-wave plate with optical axis aligned at 45 degree from polarization direction, as shown in FIG. 16. That is, in the second state, a voltage that is below a threshold voltage is applied to the transmissional polarization modulator array 1500 and, thus, incoming light beam polarization direction may rotate 90 degree after passing through the transmissional polarization modulator array 1500.

FIG. 16 illustrates a schematic view of the LC transmissive polarization modulator array and corresponding polarization switching optics in accordance with some examples of the present disclosure. As shown in FIG. 16, the polarization switching optics may include a half-wave plate array 1602, a walk-off crystal 1605, a quarter-wave plate 1603, a central mirror 1604, and an LC panel 1601.

The distances between the components and sizes of the components including the half-wave plate array 1602, the walk-off crystal 1605, the quarter-wave plate 1603, the central mirror 1604, and the LC panel 1601 as shown in FIG. 16 are not limited to the particular sizes and distances as illustrated in FIG. 16 and may be scaled larger or smaller. In some examples, the arrangement and sizes of the components may follow a scale, but not limited to a specific scale. For example, the distance between the central mirror 1604 and the quarter-wave plate 1603 may be within a range of 0.1 mm and 2 mm, and the width of the walk-off crystal 1606 may be within a range of 20 mm and 40 mm More specifically, the distance between the central mirror 1604 and the quarter-wave plate 1603 may be within a range of 0.1 mm and 1 mm, and the width of the walk-off crystal 1606 may be within a range of 25 mm and 30 mm. Most specifically, the distance between the central mirror 1604 and the quarter-wave plate 1603 may be 0.5 mm, and the width of the walk-off crystal 1606 may be 28 mm.

In some examples, all income light beams may not pass through the half-wave plate array 1602 and all reflective light beams from the central mirror 1604 will go through a half-wave plate of the half-wave plate array 1602. Furthermore, the polarization switching optics as a whole does not change incoming light beam polarization state and, thus, beam parallel shift from incoming light beams is achieved through birefringent walk-off. For example, a light beam with extraordinary ray (E-beam), after passing through the walk-off crystal 1605 and the quarter-wave plate 1603, will be reflected by the central mirror 1604 and passes through the quarter-wave plate 1603 once again, which changes the E-beam into a light beam with ordinary ray (O-beam). The O-beam will then turn into an E-beam after passing through the half-wave plate array 1602.

In another example, an O-beam, after passing through the walk-off crystal 1605 and the quarter-wave plate 1603, will be reflected by the central mirror 1604 and passes through the quarter-wave plate 1603 once again, which changes the O-beam into E-beam. The E-beam will then turn into an O-beam after passing through the half-wave plate array 1602.

FIG. 19 illustrates a schematic view of the WSS array optical system in a packaging view in accordance with some examples of the present disclosure. The WSS array optical system shown in FIG. 19 is arranged in accordance with the WSS array optical system shown in FIG. 6. The WSS array optical system shown in FIG. 19 includes polarization condition optics 1901 which correspond to the polarization condition optics 602 in FIG. 6, port switch direction cylindric lens 1904 which correspond to the port switch direction cylindric lens 605 in FIG. 6, dispersion direction cylindric spectrum lens 1905 which correspond to dispersion direction cylindric spectrum lens 606 shown in FIG. 6, a spectrum dispersion component 1903 which corresponds to the spectrum dispersion component 603 in FIG. 6, LC transmissive polarization modulator and polarization switching optics 1902 which correspond to the LC transmissive polarization modulator and polarization switching optics 601, and polarization condition optics 1901 which correspond to the polarization condition optics 602 in FIG. 6. As shown in FIG. 19, all the optics including 1905, 1904, 1903, 1902 and 1901 may be disposed on a board 192 and the whole packaging may include a bottom board 191. The packaging shown in FIG. 19 is not to be limited to the particular size as illustrated in FIG. 19 and may be scaled larger or smaller. In some examples, the length and width of the board 192 may be respectively, but not limited to, within a range of 120 mm to 140 mm and a range of 70 mm to 85 mm Specifically, the length and width of the board 192 may be respectively 130 mm and 78 mm. Further, the length and width of the bottom board 191 may be respectively, but not limited to, within a range of 160 mm to 200 mm and a range of 85 mm to 95 mm. Specifically, the length and width of the bottom board 191 may be respectively 180 mm and 90 mm.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A reconfigurable optical add and drop multiplexer (ROADM) system, comprising:
   a multiplexer;
   a demultiplexer; and
   a switching system configured to route optical signals through the ROADM, wherein the switching system comprises:
   a first wavelength selective switch (WSS) optically coupled to a tapping coupler and the demultiplexer and configured to receive an input optical signal from a first circulator, transmit a drop optical signal to the demultiplexer to drop one or more first wavelength channels, and output a through optical signal;
   a second WSS optically coupled to the first WSS and the multiplexer and configured to receive an add optical signal from the multiplexer to add one or more second wavelength channels, receive the through optical signal from the first WSS, and output an output optical signal to a second circulator;
   an optical channel monitor (OCM) configured to monitor the input optical signal received by the first WSS and the output optical signal output by the second WSS,
   wherein the first WSS, the second WSS, and the OCM each comprise one or more input optical ports configured to receive optical signals and one or more output optical ports configured to output optical signals, and
   wherein the first WSS, the second WSS, and the OCM include a set of shared optics configured to direct optical signals from the one or more input optical ports to the one or more output optical ports.

2. The ROADM system of claim 1, wherein the first circulator and the second circulator are a same bi-directional circulator.

3. The ROADM system of claim 1,
   wherein directing the optical signals from the one or more input optical ports to the one or more output optical ports comprises spatially separating wavelength channels of the optical signals.

4. The ROADM system of claim 1, wherein the set of shared optics comprises:
   a polarization conditioning system configured to separate the optical signals received at the one or more input optical ports into a first polarization and a second polarization orthogonal to the first polarization; and
   a dispersion system configured to spatially separate the optical signals received at the one or more input optical ports into respective wavelength channels.

5. The ROADM system of claim 1, wherein the OCM comprises a Mux WSS and a photodiode detector (PD) optically coupled to the Mux WSS.

6. The ROADM system of claim 1, wherein the set of shared optics comprises polarization conditioning optics, polarization switching optics, a port switch direction cylindric lens, a dispersion cylindric spectrum lens, and a spectrum dispersion component.

7. The ROADM system of claim 1, wherein the first WSS comprises a first Demux WSS and a second Demux WSS, the second WSS comprises a first Mux WSS and a second Mux WSS, and the OCM comprises a first OCM and a second OCM,
   wherein the first Demux WSS is optically coupled to the tapping coupler and is configured to receive the input optical signal from the first circulator, transmit the drop optical signal to the demultiplexer to drop the one or more first wavelength channels, and output the through optical signal to the first Mux WSS,
   wherein the first Mux WSS is optically coupled to the first Demux WSS and is configured to receive the add optical signal from the multiplexer, receive the through optical signal from the first Demux WSS, and output the output optical signal to the second circulator, and
   wherein the first OCM is optically coupled to the tapping coupler and a second tapping coupler and is configured to monitor the input optical signal received by the first Demux WSS and the output optical signal output by the first Mux WSS.

8. The ROADM system of claim 7, further comprising:
   a second multiplexer; and
   a second demultiplexer,
   wherein the second Demux WSS is optically coupled to a third tapping coupler and is configured to receive a second input optical signal from the second circulator, transmit a second drop optical signal to the second demultiplexer to drop the one or more first wavelength channels, and output a second through optical signal to the second Mux WSS,
   wherein the second Mux WSS is optically coupled to the second Demux WSS and is configured to receive a second add optical signal from the second multiplexer, receive the second through optical signal from the second Demux WSS, and output a second output optical signal to the first circulator, and
   wherein the second OCM is optically coupled to the third tapping coupler and a fourth tapping coupler and is configured to monitor the second input optical signal received by the second Demux WSS and the second output optical signal output by the second Mux WSS.

9. The ROADM system of claim 7, wherein each of the first Demux WSS, the second Demux WSS, the first Mux WSS, the second Mux WSS, the first OCM, and the second OCM corresponds to a respective subset of the one or more input optical ports and the one or more output optical ports.

10. The ROADM system of claim 9, wherein the respective subsets are arranged in two rows and three columns.

11. The ROADM system of claim 1, wherein the set of shared optics comprises a liquid crystal (LC) polarization switching array comprising a first row of pixel array and a second row of pixel array, and
   wherein each row of pixel array comprises three switch controlling sections, and each switch controlling section comprises a plurality of LC elements.

12. The ROADM system of claim 7, wherein;
   the set of shared optics comprises a liquid crystal (LC) polarization switching array comprising a first row of pixel array and a second row of pixel array,
   the first row of pixel array comprises three switch controlling sections respectively configured to control the first Demux WSS, the first Mux WSS, and the first OCM, and
   the second row of pixel array comprises three switch controlling sections respectively configured to control the second Demux WSS, the second Mux WSS, and the second OCM.

13. The ROADM system of claim 12, wherein the three switch controlling sections of the first row of pixel array and the three switch controlling sections of the second row of pixel array are arranged in three different columns.

14. A switching system, comprising:
   a first wavelength selective switch (WSS) optically coupled to a tapping coupler and configured to receive an input optical signal from a first circulator, transmit a drop optical signal to a demultiplexer to drop one or more first wavelength channels, and output a through optical signal;

a second WSS optically coupled to the first WSS and configured to couple to a multiplexer, receive an add optical signal from the multiplexer to add one or more second wavelength channels, receive the through optical signal from the first WSS, and output an output optical signal to a second circulator;

a optical channel monitor (OCM) configured to monitor the input optical signal received by the first WSS and the output optical signal output by the second WSS;

wherein the first WSS, the second WSS, and the OCM each comprise one or more input optical ports configured to receive optical signals and one or more output optical ports configured to output optical signals, and wherein the first WSS, the second WSS, and the OCM include a set of shared optics configured to direct optical signals from the one or more input optical ports to the one or more output optical ports.

15. The switching system of claim 14, wherein the first circulator and the second circulator are a same bi-directional circulator.

16. The switching system of claim 14, wherein directing the optical signals from the one or more input optical ports to the one or more output optical ports comprises spatially separating wavelength channels of the optical signals.

17. The switching system of claim 14, wherein the set of shared optics comprises:

a dispersion system configured to spatially separate the optical signals received at the one or more input optical ports into respective wavelength channels; and a polarization conditioning system configured to separate the optical signals received at the one or more input optical ports into a first polarization and a second polarization orthogonal to the first polarization.

18. The switching system of claim 14, wherein the OCM comprises a Mux WSS and a photodiode detector (PD) optically coupled to the Mux WSS.

19. The switching system of claim 14, wherein the set of shared optics comprises polarization conditioning optics, polarization switching optics, a port switch direction cylindric lens, a dispersion cylindric spectrum lens, and a spectrum dispersion component.

20. The switching system of claim 14, wherein the first WSS comprises a first Demux WSS and a second Demux WSS, the second WSS comprises a first Mux WSS and a second Mux WSS, and the OCM comprises a first OCM and a second OCM, wherein the first Demux WSS is optically coupled to the tapping coupler and is configured to receive the input optical signal from the first circulator, transmit the drop optical signal to the demultiplexer to drop the one or more first wavelength channels, and output the through optical signal to the first Mux WSS, wherein the first Mux WSS is optically coupled to the first Demux WSS and is configured to receive the add optical signal from the multiplexer, receive the through optical signal from the first Demux WSS, and output the output optical signal to the second circulator, wherein the first OCM is optically coupled to the tapping coupler and a second tapping coupler and is configured to monitor the input optical signal received by the first Demux WSS and the output optical signal output by the first Mux WSS, wherein the second Demux WSS is optically coupled to a third tapping coupler and is configured to receive a second input optical signal from the second circulator, transmit a second drop optical signal to a second demultiplexer to drop the one or more first wavelength channels, and output a second through optical signal to the second Mux WSS, wherein the second Mux WSS is optically coupled to the second Demux WSS and is configured to receive a second add optical signal from a second multiplexer, receive the second through optical signal from the second Demux WSS, and output a second output optical signal to the first circulator, and wherein the second OCM is optically coupled to the third tapping coupler and a fourth tapping coupler, and is configured to monitor the second input optical signal received by the second Demux WSS and the second output optical signal output by the second Mux WSS.

*    *    *    *    *